(12) United States Patent
Powell

(10) Patent No.: US 10,995,023 B2
(45) Date of Patent: May 4, 2021

(54) WATER TREATMENT DEVICE

(71) Applicant: Polar Vortex, LLC, Nashua, NH (US)

(72) Inventor: Gary Powell, North Reading, MA (US)

(73) Assignee: POLAR VORTEX, LLC, Nashua, NH (US)

( * ) Notice: Subject to any disclaimer, the term of this patent is extended or adjusted under 35 U.S.C. 154(b) by 0 days.

(21) Appl. No.: 16/313,346

(22) PCT Filed: Aug. 13, 2018

(86) PCT No.: PCT/IB2018/056098
§ 371 (c)(1),
(2) Date: Dec. 26, 2018

(87) PCT Pub. No.: WO2019/030741
PCT Pub. Date: Feb. 14, 2019

(65) Prior Publication Data
US 2020/0325046 A1     Oct. 15, 2020

Related U.S. Application Data

(60) Provisional application No. 62/544,594, filed on Aug. 11, 2017.

(51) Int. Cl.
*B01F 5/06* (2006.01)
*C02F 1/34* (2006.01)
(Continued)

(52) U.S. Cl.
CPC ............ *C02F 1/725* (2013.01); *B01F 5/0688* (2013.01); *C02F 1/705* (2013.01); *C02F 2103/42* (2013.01);
(Continued)

(58) Field of Classification Search
CPC ........ B01F 5/06; B01F 5/0682; B01F 5/0687; B01F 5/0688; C02F 1/705; C02F 1/725;
(Continued)

(56) References Cited

U.S. PATENT DOCUMENTS 5,685,994 A   11/1997   Johnson
5,765,403 A   6/1998    Lincoln
(Continued)

FOREIGN PATENT DOCUMENTS

WO    WO2016156273    10/2016

*Primary Examiner* — Lucas A Stelling

(57) ABSTRACT

The water treatment device is an AOP (advanced oxidization process) apparatus that provides effective sanitation of pool water. The device includes couplings that can adapt to fit various standard pool equipment. Inside the reaction chamber of the main body, there are a nozzle and a metal catalyst. The nozzle creates water jet impinging the metal catalyst, which subsequently creates bubbles. Being entrained in the water, the bubbles substantially collapse and create high temperature and pressure changes. These changes cause water to go through chemical dissociation, thus creating hydroxyl radicals, a highly reactive oxidizer. In a fast rate, the hydroxyls attach to and destroy organic contaminants in the water. The metal catalyst remains chemically unchanged. The apparatus has a long service life and substantially reduces the use of chemicals in a pool.

4 Claims, 5 Drawing Sheets

(51) Int. Cl.
   *C02F 1/70* (2006.01)
   *C02F 1/72* (2006.01)
   *C02F 103/42* (2006.01)

(52) U.S. Cl.
   CPC .. *C02F 2201/003* (2013.01); *C02F 2201/004* (2013.01)

(58) Field of Classification Search
   CPC ............ C02F 2103/42; C02F 2201/003; C02F 2201/004; C02F 2303/04; C02F 2303/26; C02F 2305/023
   See application file for complete search history.

(56) References Cited

U.S. PATENT DOCUMENTS

| | | |
|---|---|---|
| 2012/0205301 A1 | 8/2012 | McGuire |
| 2014/0363855 A1* | 12/2014 | Gordon ................. B01F 5/0688 435/99 |
| 2016/0083275 A1 | 3/2016 | Kolstad |
| 2016/0137539 A1 | 5/2016 | Wu |

* cited by examiner

WATER TREATMENT DEVICE

The current application claims a priority to the U.S. Provisional Patent application Ser. No. 62/544,594 filed on Aug. 11, 2017.

FIELD OF THE INVENTION

The present invention relates generally to a water treatment device. More specifically, the present invention comprises a series of nozzles and a metal catalyst for filtering and sanitizing pool water. The present invention allows a user to keep the swimming pool free of algae and bacteria with reduced use of harmful chemicals.

BACKGROUND OF THE INVENTION

Swimming on a hot summer day is one of the best ways to cool off and relax, but it is nearly impossible to have the certitude that the pool is properly maintained, and the water is clean and safe for activities. On the market there are numerous available methods of filtering and sanitizing pool water. Most commonly used methods and devices rely on the addition of chemicals or highly complex filtration systems to remove harmful bacteria and unwanted particles from the water. Chlorine is widely used in pools across the United States and throughout the world since it kills bacteria and provides algae control. Other chemicals are also added to keep the walls and bottom of the pool clean, and to discourage algae growth. Since pool water is generally highly treated health issues can arise for people that have chlorine allergies, or sensitive skin. Unpleasant symptoms such as itchy skin, and runny nose can occur and therefore make the whole experience undesirable. Even for people without health conditions chlorinated pool water can cause issues, since it not only does have a specifically strong odor but it can also cause discomfort if it reaches the eyes of the swimmer.

Since chlorinated substances normally raise the pH of water, the addition of hydrochloric acid is required to lower the affected pH levels of the water to a more acceptable neutral value. Improper monitoring of the water quality in pools can cause a plurality of health issues for swimmers that get constant exposure such as competitive athletes. People choose to swim in pools because they create a controlled environment that is assumed to be safe, however, with all the possible problems mentioned above, it may turn out to be a significant health hazard.

Therefore, it is essential to find and use alternative methods and devices to filter and sanitize pool water. Over the last half century, many alternative methods were discovered to completely eliminate or significantly reduce the use of chlorine and other chemicals in swimming pools. Currently, there are four popular alternatives for sanitizing pool water. These are: salt chlorine generator, bromine sanitizer, ionizer, and advanced oxidizer process (AOP).

A salt chlorine generator is usually connected to the pool equipment power supply to produce chlorine in a form that is softer than the traditional chlorine sanitizer used in pools. This form of chlorine does not have the smell or irritants that the traditional chlorine sanitizer has. Thus, swimmers typically experience less eye and skin irritations. Instead of treating the water with directly pouring traditional chlorine into the pool, the salt chlorine generator continues to generate chlorine until more salt is needed. However, this device usually has high initial cost and maintenance cost for additional salt cells. Further, the salt chlorine generator causes excessive salt concentrations in the swimming pool, which are corrosive and can cause damages to pool liners, handrails, light fixtures, and other pool equipment.

Just like chlorine, bromine sanitizes water through reaction with bacteria, organics, and other water contaminants. But the processes are different. Chlorine becomes inactive once reacted and combined with contaminants. Unlike chlorine, bromine is more stable and continues to work even after combined with contaminants, especially in warm water. Thus, bromine lasts longer than chlorine. Additionally, bromine has less chemical smell and causes less irritation than chlorine. But bromine is harder to be removed once it gets to a swimmer's skin. Further, bromine is more expensive than chlorine and normally not an economical choice.

Ionizers use electrically charged electrodes made of metal, normally copper, silver, nickel, etc., to release ions into pool water. The metal ions then combine with contaminants to kill them. This type of sanitizer normally inexpensive. Replacing the metal electrodes in ionizers is not expensive either. Further, Ionizers do not cause many chlorine related problems such as smell, skin irritation, equipment corrosion, etc. However, ionizers do not oxidize pool water, and it takes a slow process for ions to fight contaminants. Additionally, metal staining such as copper can occur, and maintenance can be costly.

An AOP apparatus takes advantage of the chemical process of oxidation to remove organic contaminants from pool water. The apparatus creates hydroxyl radicals which are a highly reactive and unstable chemical species. Hydroxyls kill organic contaminants by attaching to the cells, disrupting the composition, and causing breakdown and destruction. They can kill chlorine-resistant *Cryptosporidium parvum*, which has increasingly become a health concern largely in commercial swimming pools. Additionally, hydroxyls have substantially higher oxidizing potential than most pool water treatment oxidizers such as chlorine, bromine, potassium monopersulfate, hydrogen peroxide, and ozone. Thus, hydroxyls react with organic materials in a very fast rate so that users do not have to wait for a long time to use the pool after treatment, comparing with other sanitation methods. Based on how the hydroxyls are created, there are four types of AOP apparatus: water electrolysis, direct ozone injection, ultraviolet (UV) accelerated ozone system, and direct hydroxyl injection.

A water electrolysis apparatus generally comprises electrically charged electrodes, a cathode and anode, usually copper and silver submerged in water. Under electrical charge, the electrodes decay and at the same time causing water molecules to dissociate into hydrogen atoms and hydroxyl radicals. Not only the metal electrodes need to be replaced over time, but the apparatus can have safety concerns with electric current in the pool water.

Directly injecting ozone gas to pool water can sanitize the water in a fast rate since ozone is a strong oxidizer, stronger than chlorine. Ozone has a short half-life. Therefore, it is usually used soon after it is produced. Ozone is only effective in the water return line in the pool. After being returned to the pool water, the ozone is normally released to the atmosphere. Additionally, high ozone concentration in a pool can be harmful thus is a health and safety concern. Other ozone-based AOP systems such as UV accelerated ozone systems create ozone by passing oxygen through a UV lamp. A direct hydroxyl injection system creates oxygen atoms by treating oxygen gas in ambient air. The oxygen atoms are then injected into the pool, and a large number of hydroxyls is subsequently created in the water. The direct hydroxyl injection is generally more effective than ozone systems because hydroxyl radical is a stronger oxidizer than ozone. However, it is usually very costly to create hydroxyls through treating oxygen.

The present invention aims to create clean and safe swimming conditions for users while reducing the need of harsh chemicals or complex filters that require extensive maintenance. The present invention also makes maintenance of the pool equipment efficient and convenient since it decreases the need for constant supervision of the chlorine and pH level. As an effective AOP system, the present invention provides all the benefits an AOP system offers and at the same time solves the problems associated with AOP. The present invention comprises a simple structure with low manufacturing and maintenance costs. The preferred embodiment of the present invention includes a reaction chamber inside a main body. The reaction chamber comprises a nozzle with a plurality of chamfered holes and a metal catalyst. When pool water is pumped into the main body by a pool water circulation system, the pressure and temperature of the water change dramatically through the plurality holes of the nozzle. Subsequently water forms bubbles and bubbles collapse into the metal catalyst. The drastic change of water bubbles causes chemical dissociation of water molecules resulting in hydrogen atoms and hydroxyl radicals. The newly created hydroxyl radicals then react with organic materials to effectively removes contaminants from the pool water. When the vapor bubbles collapse, a plurality of effects occurs, such as increased heat, harmonics, and vibration, all of which contribute to the sanitation process. The resulting strong hydroxyls create an environment in which suspended particles in the water coagulate and drop out of suspension. In this process, the metal catalyst does not participate in the chemical reaction but substantially accelerate the water molecule dissociation. The metal catalyst has a long service life in the present invention thus minimizing maintenance of the device. The user of the present invention can enjoy a pleasant swimming experience without the continuous concern about how the water might affect their health since the reduced use of chemicals prevents the usual side effects associated with these substances.

DETAIL DESCRIPTIONS OF THE INVENTION

All illustrations of the drawings are for the purpose of describing selected versions of the present invention and are not intended to limit the scope of the present invention.

People often find themselves looking for a safe environment to swim, but since natural bodies of water can be uncertain in terms of pollution levels, wildlife, and are usually seasonal according to regional climate, the need for a controlled clean water environment arose. Swimming pools provide such a setting. To maintain a clean pleasant experience, however, the water needs to be constantly filtered and treated, most of the time with the use of harsh chemicals that increase the possibility for negative side effects to human health.

Figure 1:
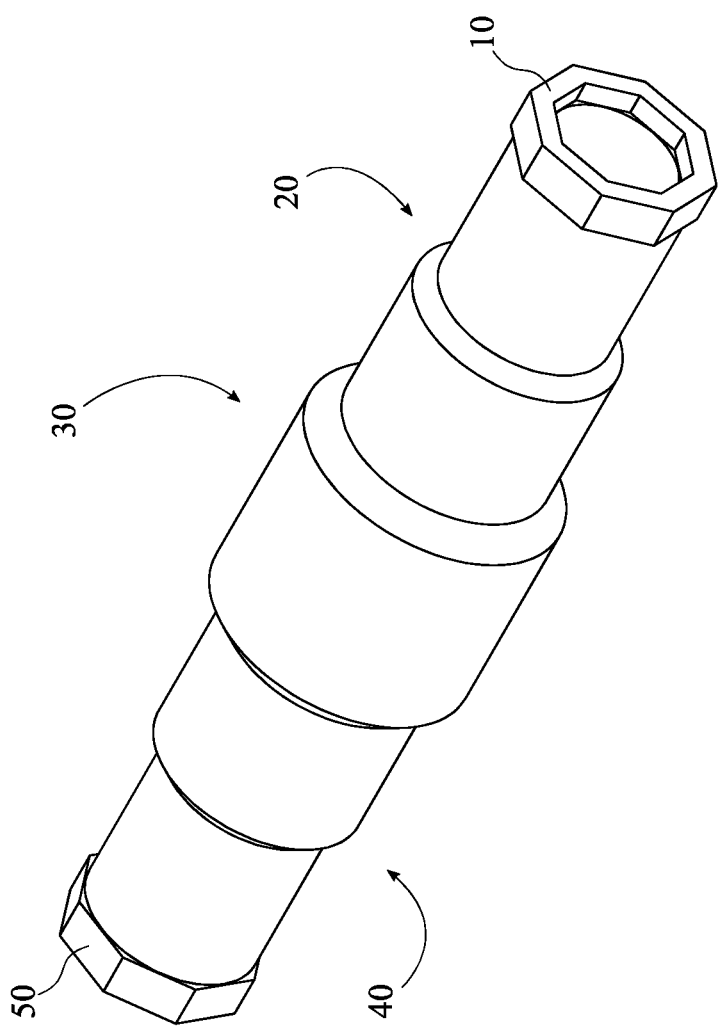
FIG. 1 is an isometric view of the present invention.
Figure 2:
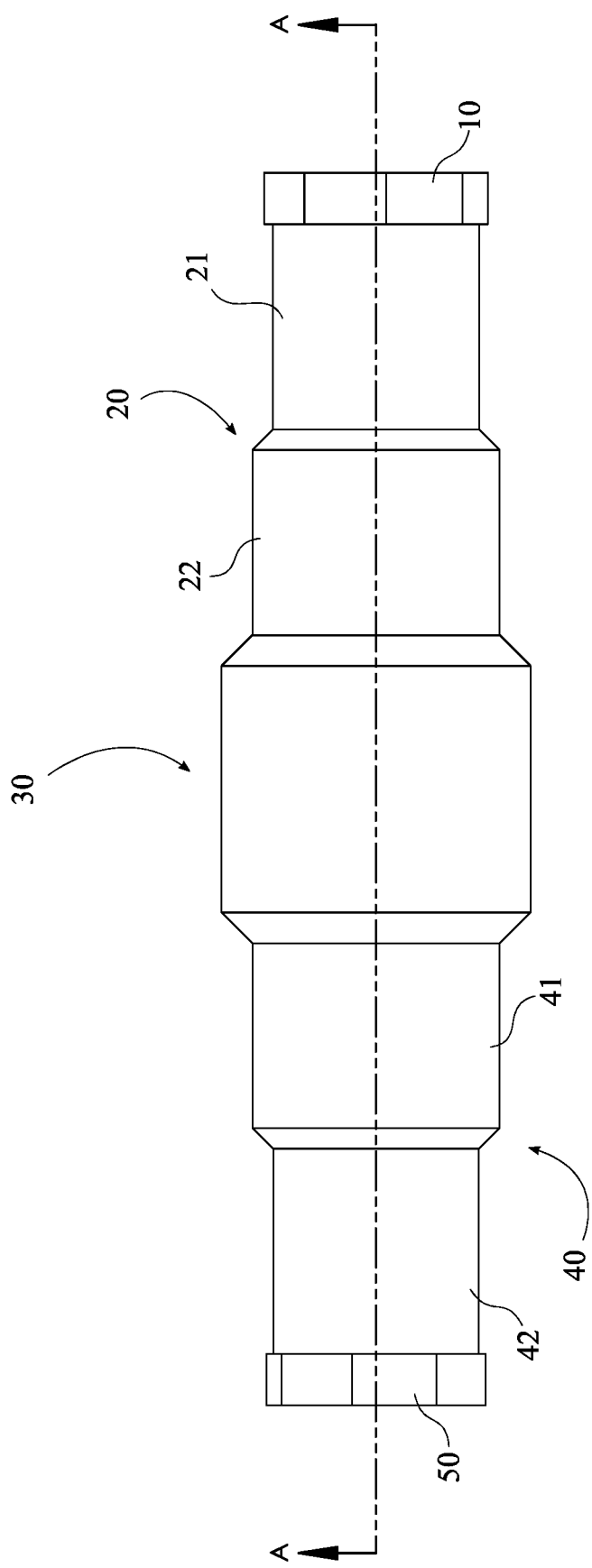
FIG. 2 is a front view of the present invention indicating the direction of section cut A.

As seen in FIGS. 1-2, the present invention is a water treatment device that comprises a first coupling 10, an inlet 20, a main body 30, an outlet 40, and a second coupling 50. The first coupling 10 is terminally and concentrically connected to the inlet 20, opposite to the main body 30. The first coupling 10 provides a means to connect the present invention to an existing pool water circulation system and allows pressurized water to enter the water treatment device for sanitation. The first coupling 10 can be easily adapted to fit a plurality of standard filtration system attachments in the industry. The inlet 20 is terminally and concentrically connected to the main body 30 and positioned in between the first coupling 10 and the main body 30. The inlet 20 guides inflow of water from the first coupling 10 to the main body 30. The main body 30 is positioned in between the inlet 20 and the outlet 40. When water flows through the main body 30, where the sanitation process occurs, bacteria, organics, and other contaminants are removed out of the water. The outlet 40 is terminally and concentrically connected to the main body 30, opposite the inlet 20. The second coupling 50 is terminally and concentrically connected to the outlet 40, opposite the first coupling 10. Like the first coupling 10, the second coupling 50 also can be conveniently adapted to fit various standard filtration systems. The sanitized water flows out of the main body 30, through the outlet 40, and back to the pool circulation stream through the second coupling 50.

Figure 3:
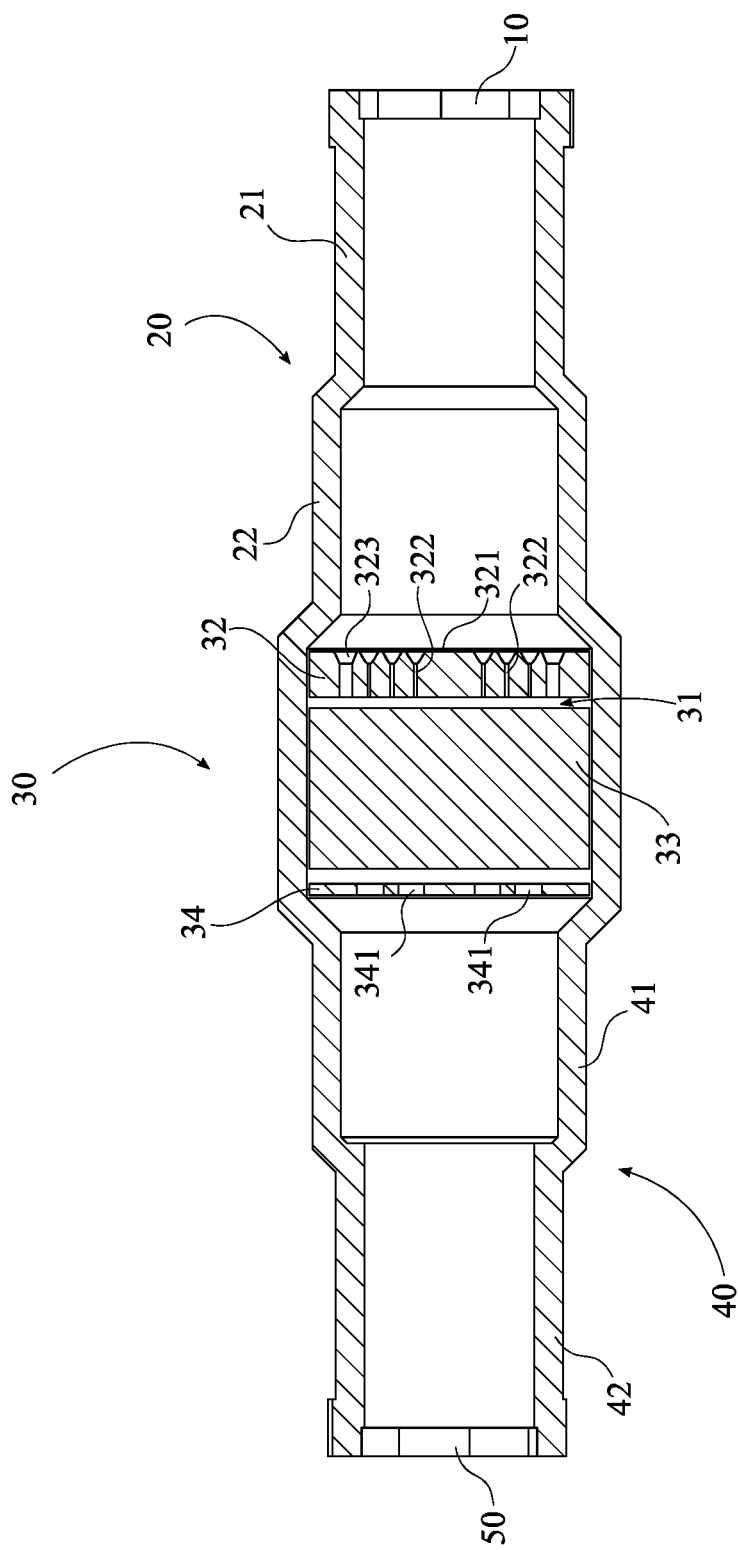
FIG. 3 is a top view of section A of the present invention.

In the preferred embodiment of the present invention, the inlet 20 comprises a first narrow-section 21 and a first wide-section 22, as can be seen in FIGS. 2-3. The first narrow-section 21 is terminally and concentrically connected to the first coupling 10. The first wide-section 22 is terminally and concentrically connected to the main body 30, opposite the first coupling 10 along the first narrow-section 21. The first narrow-section 21 and the first wide-section 22 are concentrically connected to guide water flow into the hydraulic harmonic nozzle 32 located on the main body 30. The outlet 40 comprises a second wide-section 41 and a second narrow-section 42. The second wide-section 41 is terminally and concentrically connected to the main body 30 opposite the first wide-section 22. The second narrow-section 42 is terminally and concentrically connected to the second coupling 50, opposite the first narrow-section 21. The second wide-section 41 and the second narrow-section 42 are concentrically connected to guide treated water to flow out of the present invention through the second coupling 50. The symmetrically arrangement and structure of the inlet and outlet provides the balanced water flow when the water sanitation device is connected to the pool water circulation system.

Figure 4:
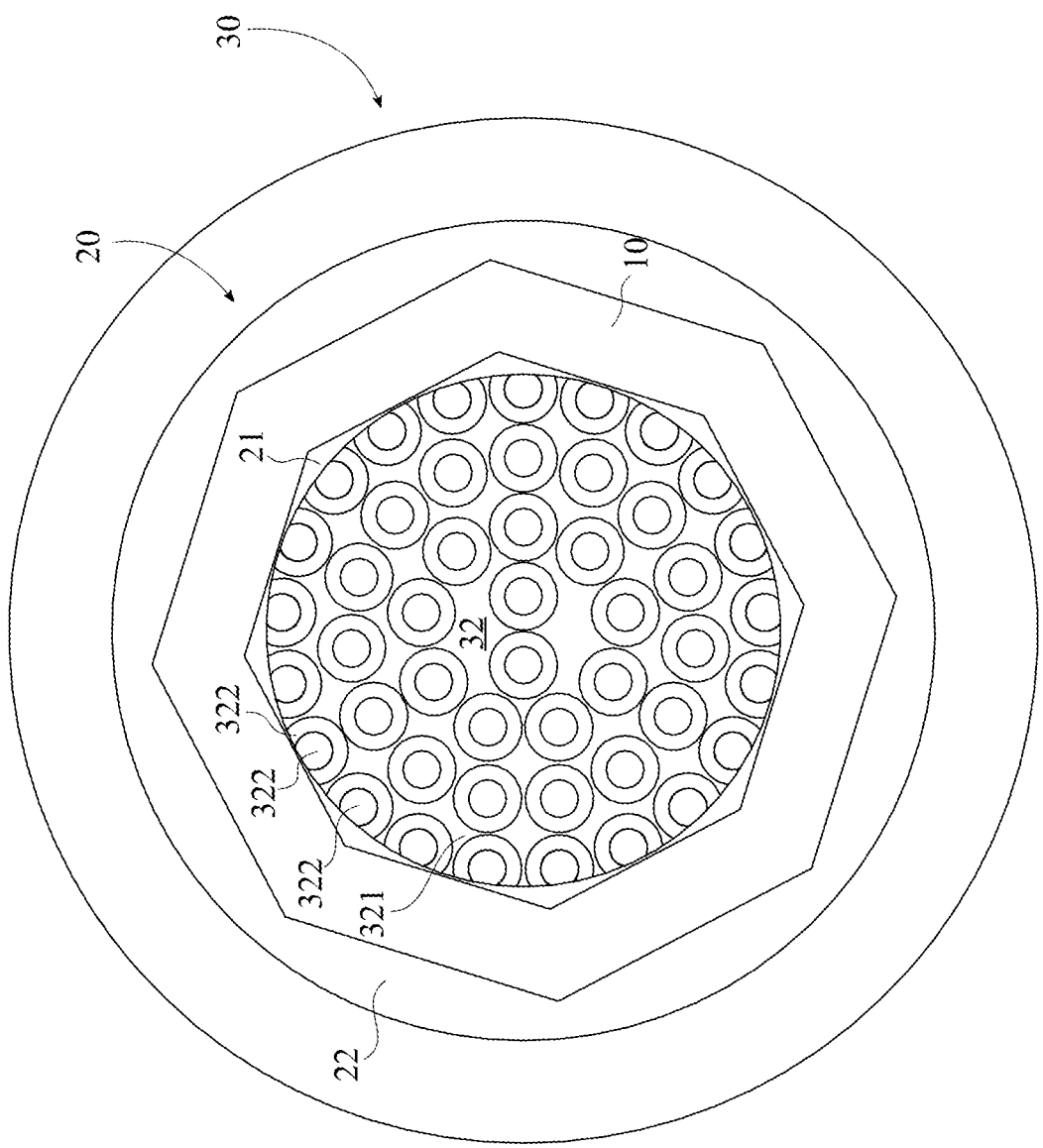
FIG. 4 is a right view of the present invention, which shows the inlet and the hydraulic harmonic nozzle of the present invention.
Figure 5:
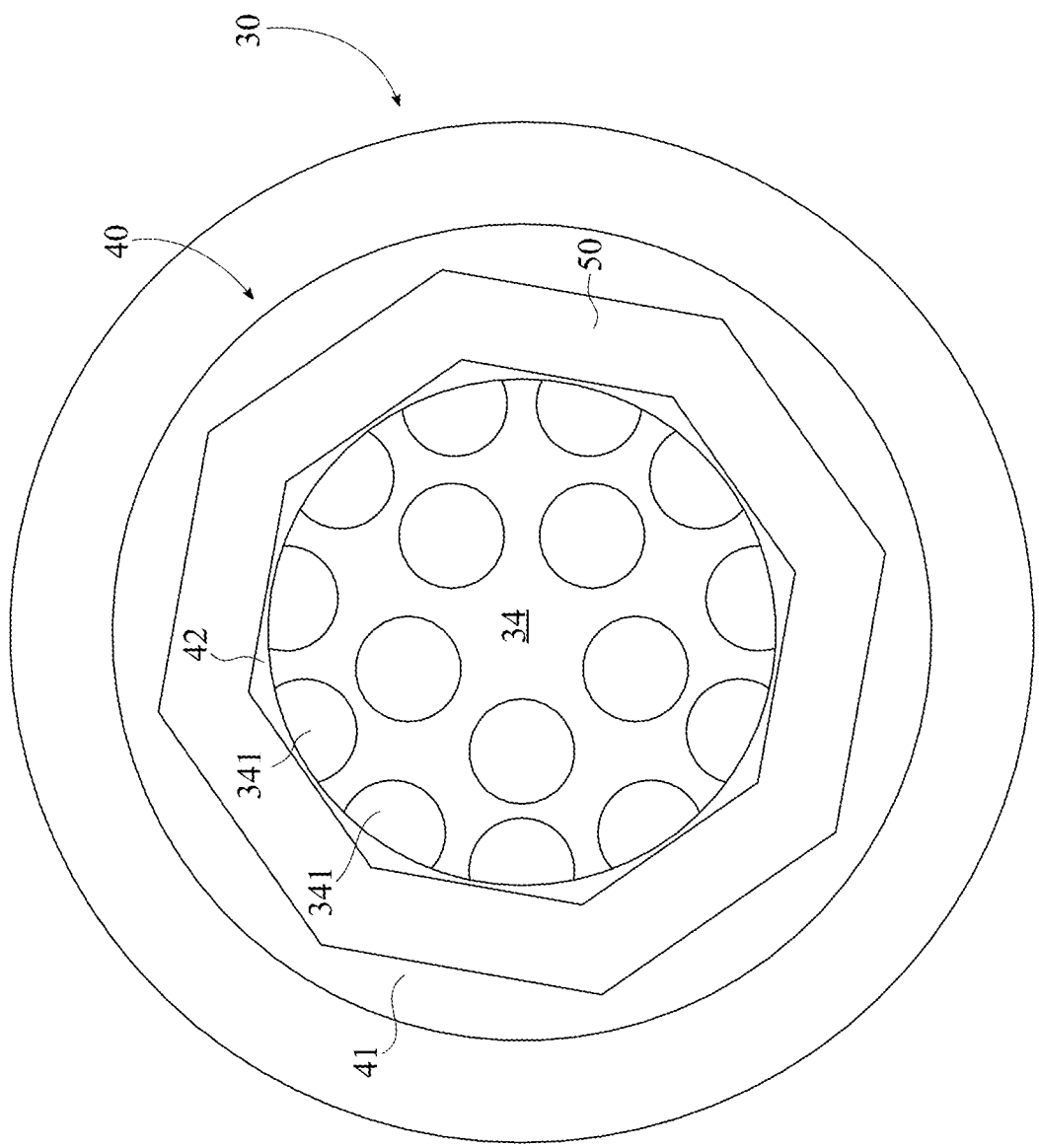
FIG. 5 is a left view of the present invention, which shows the outlet and the catalyst retainer plate of the present invention.

As seen in FIG. 3, the main body 30 of the present invention comprises a reaction chamber 31, a hydraulic harmonic nozzle 32, a metal catalyst 33, and a catalyst retainer plate 34. The hydraulic harmonic nozzle 32 is positioned within the reaction chamber 31 adjacent to the inlet 20. The catalyst retainer plate 34 is concentrically positioned within the reaction chamber 31 adjacent to the outlet 40, opposite the hydraulic harmonic nozzle 32 as illustrated in FIG. 4. The metal catalyst 33 is positioned between the hydraulic harmonic nozzle 32 and the catalyst retainer pate 34. The catalyst retainer plate 34 comprises a plurality of through holes 341 which are distributed across the catalyst retainer plate 34. The plurality of through holes 341 facilitates the flow of treated water out of the main body 30 while retaining the metal catalyst 33 and the hydraulic harmonic nozzle within the reaction chamber 31. The catalyst retainer plate 34 is to be made of corrosion resistant materials, which may include metal such as nickel, and/or PVC, but are not limited to these materials. The catalyst retainer plate 34 is designed to hold the reaction chamber 31 inside the main body 30, while being able to withstand the forces created by water turbulence inside the reaction chamber 31.

The hydraulic harmonic nozzle 32 comprises a circular disk 321 and a plurality of chamfered holes 322, as seen in FIGS. 3-4. The circular disk 321 is concentrically position within the reaction chamber 31, opposite the catalyst retainer plate 34. The plurality of chamfered holes 322 is distributed across the circular disk 321, and each of the plurality of the chamfered holes has a chamfer being positioned adjacent to the inlet 10. In the preferred embodiment of the present invention, each of the plurality of chambered holes 322 comprises a 45 degree chamfer. Any other suitable chamfer can be used in the present invention. When pool water is pumped into the inlet 20 and the hydraulic harmonic nozzle 32, by a pool water circulation system, the water first flows through the chamfer and the smaller hole of each of the chamfered holes 322. The water pressure changes dramatically when coming out of the plurality of the chamfered holes of 322 while turning into a high velocity jet. After impinging on the metal catalyst 33. the water jet creates bubbles at the stagnation area of the jet, where the water pressure drops substantially. These bubbles are entrained in the water flow. As they leave the low pressure region, the bubbles begin to collapse creating substantial amount of heat energy and shock waves that propagate through the water. The substantially high pressure and temperature created during this process of bubble forming and collapsing causes the water to dissociate into hydroxyl radicals and hydrogen atoms as follows:

$$H_2O \Rightarrow H^+ + OH^-$$

The hydroxyl radical is a highly reactive and unstable chemical species. As the process continues in the reaction chamber 31, more and more hydroxyl radicals are created in the water. The hydroxyl radicals immediately attach to the cells of the organic contaminants in the water, disrupt the composition, and cause breakdown and destruction. Additionally, hydroxyls have substantially higher oxidizing potential than most pool water treatment oxidizers such as chlorine, bromine, potassium monopersulfate, hydrogen peroxide, and ozone. Thus, hydroxyls react with organic materials in a very fast rate. The user does not have to wait for a long time to use the pool after treatment, comparing with other sanitation methods.

The metal catalyst 33 can have various metals, physical and chemical combinations of various metals, various forms and shapes. The preferred embodiment of the metal catalyst 33 of the present invention is a nickel/copper wire coil. Other embodiments include nickel/copper wire mesh, sintered nickel/copper mesh, nickel/copper mesh disk, copper alloy wire mesh, copper alloy wire coil, copper alloy disk, etc. The metal catalyst 33 accelerates the chemical dissociation reaction of water molecules after the vapor bubble collapses. Since the metal catalyst 33 retains the chemical form, the reaction can go on indefinitely, eliminating the need for replacing the metal catalyst. In traditional ionizing systems the ionization consumes the material as the overall operation time rises, requiring replacement at certain intervals when the material wears out, or becomes ineffective. The metal catalyst 33 in the present invention increases both the abrasion and corrosion resistance of the reaction chamber increasing the lifetime of the present invention. This ensures long lasting operation for the present invention at a minimal cost for the user. Thus, the user of the present invention can enjoy a pleasant swimming experience without the continuous concern about how the water might affect their health since the reduced use of chemicals prevents the usual side effects associated with these substances.

What is claimed is:

1. A water treatment device for sanitizing pool water comprising:
   a first coupling;
   an inlet;
   a main body;
   an outlet;
   a second coupling;
   the first coupling being terminally and concentrically connected to the inlet, opposite the main body;
   the inlet being terminally and concentrically connected to the main body;
   the outlet being terminally and concentrically connected to the main body, opposite the inlet;
   the second coupling being terminally and concentrically connected to the outlet, opposite the first coupling;
   the main body comprising a nozzle, a reaction chamber, a metal catalyst;
   the nozzle being positioned within the reaction chamber adjacent to the inlet;
   the nozzle comprising a circular disk and a plurality of chamfered holes;
   the circular disk being concentrically positioned within the reaction chamber;
   the plurality of chamfered holes being distributed across the circular disk;
   each of the plurality of chamfered holes comprising a chamfer;
   the chamfer of each of the plurality of chamfered holes being positioned adjacent to the inlet;
   the chamber of each of the plurality of chamfered holes being a 45 degree chamfer;
   the metal catalyst being a nickel/copper combination; and
   the nickel/copper combination being a wire coil or a wire mesh or a sintered mesh or a mesh disk.

2. The water treatment device for sanitizing pool water as claimed in claim 1 comprising:
   a catalyst retainer plate;
   the catalyst retainer plate being concentrically positioned within the reaction chamber adjacent to the outlet, opposite the nozzle;
   the metal catalyst being positioned between the nozzle and the catalyst retainer plate;
   the catalyst retainer plate comprising a plurality of through holes; and
   the plurality of through holes being distributed across the catalyst retainer plate.

3. The water treatment device for sanitizing pool water as claimed in claim 1 comprising:
   the inlet comprising a first narrow-section and a first wide-section;
   the outlet comprising a second narrow-section and a second wide-section;
   the first narrow-section being terminally and concentrically connected to the first coupling;
   the first wide-section being terminally and concentrically connected to the main body, opposite the first coupling along the first narrow-section;

the second wide-section being terminally and concentrically connected to the main body, opposite the first wide-section; and the second narrow-section being terminally and concentrically connected to the second coupling, opposite the first narrow-section.

4. A water treatment device for sanitizing pool water comprising:
- a first coupling;
- an inlet;
- a main body;
- an outlet;
- a second coupling;
- the first coupling being terminally and concentrically connected to the inlet, opposite the main body;
- the inlet being terminally and concentrically connected to the main body;
- the outlet being terminally and concentrically connected to the main body, opposite the inlet;
- the second coupling being terminally and concentrically connected to the outlet, opposite the first coupling;
- the main body comprising a nozzle, a reaction chamber, a metal catalyst, and a catalyst retainer plate;
- the nozzle being positioned within the reaction chamber adjacent to the inlet;
- the catalyst retainer plate being concentrically positioned within the reaction chamber adjacent to the outlet, opposite the nozzle;
- the metal catalyst being positioned between the nozzle and the catalyst retainer plate;
- the nozzle comprising a circular disk and a plurality of chamfered holes;
- the circular disk being concentrically positioned within the reaction chamber;
- the plurality of chamfered holes being distributed across the circular disk;
- each of the plurality of chamfered holes comprising a chamfer;
- the chamfer of each of the plurality of chamfered holes being positioned adjacent to the inlet;
- the inlet comprising a first narrow-section and a first wide-section;
- the outlet comprising a second narrow-section and a second wide-section;
- the first narrow-section being terminally and concentrically connected to the first coupling;
- the first wide-section being terminally and concentrically connected to the main body, opposite the first coupling along the first narrow-section;
- the second wide-section being terminally and concentrically connected to the main body, opposite the first wide-section;
- the second narrow-section being terminally and concentrically connected to the second coupling, opposite the first narrow-section;
- the chamber of each of the plurality of chamfered holes being a 45 degree chamfer;
- the metal catalyst being a nickel/copper combination; and
- the nickel/copper combination being a wire coil.

\* \* \* \* \*